United States Patent [19]

Kaplan et al.

[11] 4,005,521
[45] Feb. 1, 1977

[54] LOCKED-WRAP FUEL ROD

[75] Inventors: Samuel Kaplan, Los Gatos; Alan J. Chertock, San Francisco; James R. Punches, San Jose, all of Calif.

[73] Assignee: The United States of America as represented by the United States Energy Research and Development Administration, Washington, D.C.

[22] Filed: June 17, 1975

[21] Appl. No.: 587,800

[52] U.S. Cl. .................. 29/469; 29/456; 29/428; 176/78; 176/81
[51] Int. Cl.² .................. G21C 21/02; G21C 3/12
[58] Field of Search ............ 29/469, 455, 428, 456; 176/78, 81

[56] References Cited

UNITED STATES PATENTS

| 3,186,913 | 6/1965 | Weisner et al. | 176/78 |
| 3,607,642 | 9/1971 | Murdock | 176/81 |
| 3,964,968 | 6/1976 | Kurilkin et al. | 176/78 |

FOREIGN PATENTS OR APPLICATIONS

| 1,131,573 | 10/1968 | United Kingdom | 176/78 |
| 975,297 | 11/1964 | United Kingdom | 176/78 |
| 1,013,922 | 12/1965 | United Kingdom | 176/81 |

*Primary Examiner*—C.W. Lanham
*Assistant Examiner*—Daniel C. Crane
*Attorney, Agent, or Firm*—Dean E. Carlson; Roger S. Gaither; L. E. Carnahan

[57] ABSTRACT

A method for spacing fast reactor fuel rods using a wire wrapper improved by orienting the wire-wrapped fuel rods in a unique manner which introduces desirable performance characteristics not attainable by previous wire-wrapped designs. Use of this method in a liquid metal fast breeder reactor results in: (a) improved mechanical performance, (b) improved rod-to-rod contact, (c) reduced steel volume, and (d) improved thermal-hydraulic performance. The method produces a "locked wrap" design which tends to lock the rods together at each of the wire cluster locations.

1 Claim, 12 Drawing Figures

WIRE LOCATION

FUEL ROD

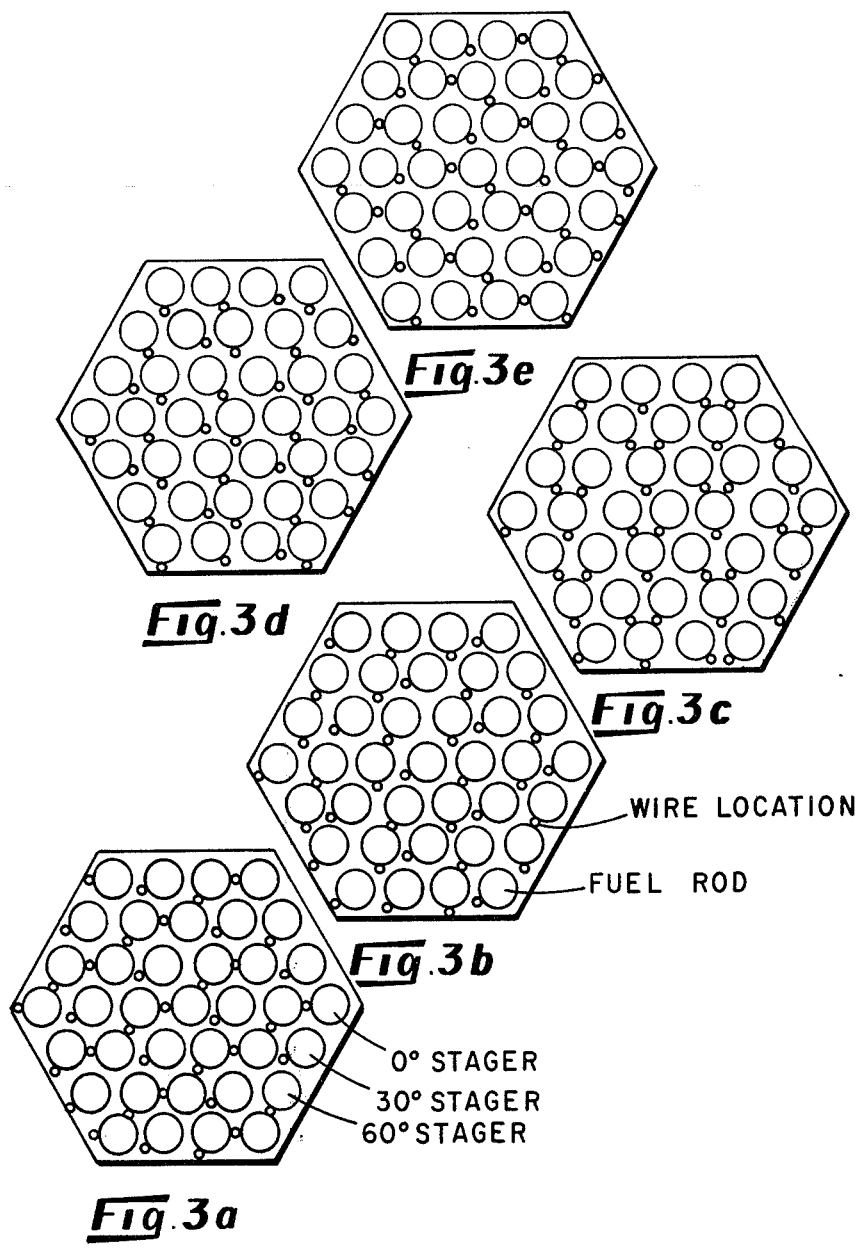

LOCKED-WRAP FUEL ROD

BACKGROUND OF THE INVENTION

The invention described herein was made in the course of, or under, Contract No. AT(04-3)-893, Task 11 with the United States Research and Development Administration.

This invention relates to nuclear reactors, particularly to wire-wrapped fuel assemblies for nuclear reactors, and more particularly, to a locked-wrap method of spacing fuel rods in such wire-wrapped fuel assemblies.

A prior known method of spacing fuel rods within a nuclear reactor fuel assembly channel is to wrap the fuel rods with circular wires in a helical pattern and to use the diameter of the wire as a spacer between adjacent fuel rods and between the outer rows of fuel rods and the adjacent channel wall. These prior wire-wrap spacing methods are generally referred to as constant-start and staggered-start arrays or designs.

The so-called constant-start design is derived by considering that all the fuel rods are oriented such that at any cross-sectional plane, including that at the wire end or "start" location, the relative positon of the wire to the fuel rod is the same for all rods.

The so-called staggered-start design is, in general, attained by rotating the fuel rods with respect to each other. This can be done in an orderly manner for fuel assemblies which use a so-called triangular pitch array by means of three different start orientations. These are positioned throughout the assembly so that the group of three rod in any triangular pitch array will contain the three different starts. A typical staggered-start design is a 0°-30°-60° array where the angles represent the relative rotational orientations of the fuel rods.

In both the constant-start and staggered-start designs the rod-to-rod spacing is attained by a single wire centered on a direct line between adjacent fuel rods and that the spacing is equal to the diameter of the wire.

As known, it is not necessary that staggered-start arrays are staggered by a uniform difference between the normal start angles. For example, rather than using a 0°-30°-60° staggered-start, a 0°-30°-80°staggered-start design can be constructed. Arbitrary selection of start angles is not permissible, however, due to physical interference of the wires of two adjacent fuel rods. This tends to occur when a fuel rod is rotated approximately 120° or greater relative to an adjacent fuel rod for the range of interest of the assembly geometry parameter called the pitch-to-diameter ratio. This range is generally between 1.15 and 1.30.

Staggered-start designs are of consideration in wire-wrapper spaced fuel assemblies for the LMFBR because certain advantages exist compared to constant-start designs. Two potential advantages are lower contact loads between fuel rods and more favorable displacements of the fuel rods, relative to each other and to the channel wall. These potential advantages are desirable because a differential growth can occur between the bundle or assembly of fuel rods and the channel containing the bundle which is due to the two phenomena, differential thermal expansion and irradiation-induced differential swelling.

In view of the potential advantages of the staggered-start design, further efforts determined that the optimum staggered array would be attained if the rods could be staggered at an orientaion of 0°-120°-240°. However, it was found not possible to construct a 0°-120°-240° staggered-start fuel bundle and have the same pitch-to-diameter ratio, due to physical interference of the wires, as mentioned above. Accordingly, a need existed in the prior art fuel rod wire-wrap designs for a method of wire-wrapping which can obtain the optimum advantages of the staggered-start array.

SUMMARY OF THE INVENTION

The invention is directed to a method of spacing fuel rods by using a wire-wrapped array wherein the advantages of the staggered-start method is obtained without wire interference so that the desired pitch-to-diameter ratio (1.15–1.30) can be maintained. In addition, the wire-wrap method of this invention provides other desirable performance characteristics which includes the tendency of the wires of the adjacent fuel rods to lock the rods together at each of the wire cluster locations, thereby producing a wire-locked-wrap design. More specifically, a 0°-120°-240° staggered-start wire-wrap method is provided which can be physically assembled for a given pitch-to-diameter ratio by decreasing the wire diameter to eliminate the wire-to-wire interference caused by the prior-known wire-wrap techniques.

This method thus provides a number of inherent advantages over the prior approaches which include: improved mechanical performance, improved rod-to-rod contact, reduced steel volume, and improved thermal-hydraulic performance.

Therefore, an object of this invention is to provide an improved method for wire-wrapping nuclear fuel rods in a fuel assembly.

A further object of the invention is to provide a method for spacing fast reactor fuel rods using a wire wrapping improved by orienting the wire-wrapped rods in a manner which introduces desirable performance characteristics not attainable by previous known methods.

Another object of the invention is to provide a wire-lockwrap spacing method for nuclear fuel rods wherein the wires of the adjacent rods tend to lock the rods together at each of the wire cluster locations.

Another object of the invention is to provide a 0°-120°-240° staggered-start wire-wrap method for spacing fuel rods.

Another object of the invention is to provide a lock-wrap spacing method for fuel rods using a 0°-120°-240° staggered-start array and maintaining the given pitch-to-diameter ratio by decreasing the wire diameter to eliminate wire-to-wire interference.

Other objects of the invention will become readily apparent from the following description and accompanying drawings.

BRIEF DESCRIPTION OF THE DRAWINGS

FIGS. 3a–3e illustrate the prior known 0°-30°-60° staggered-start wire-wrap technique with a 12 inch wire wrap pitch;

DESCRIPTION OF THE INVENTION

Figure 1:
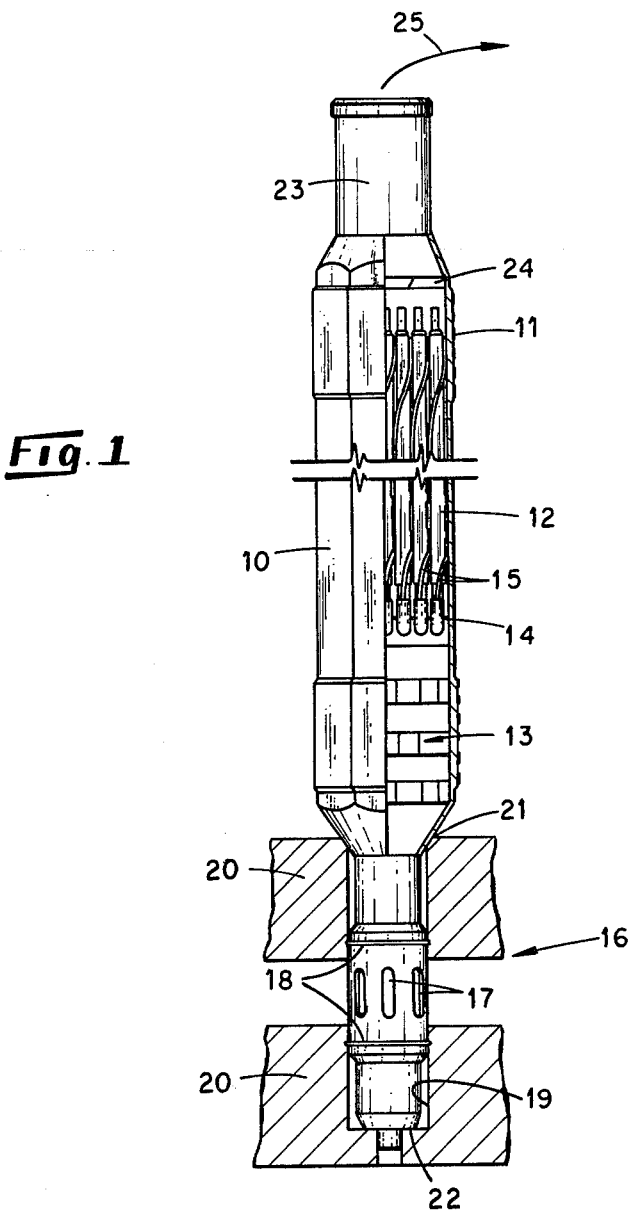
FIG. 1 is a view, partially in cross-section of a typical LMFBR wire-wrap fuel assembly.

The fuel assembly is the major heat generating component of the reactor core in a nuclear power plant. The basic objective of the fuel assembly design in a liquid metal fast breeder reactor (LMFBR) is to produce energy by means of a high integrity assembly of fissionable material that can be arranged in a critical array in the reactor core and can be readily cooled by sodium at the reactor design conditions. A typical LMFBR wire-wrap fuel assembly is illustrated in FIG. 1 and basically consists of fuel rods, spacers, and a fuel channel assembly. The fuel rods are arranged in a triangular pitch separated from each other and from the hexagonal channel that surrounds the fuel rods by wire-wrap spacers. Referring now to FIG. 1, the wire-wrap fuel assembly embodiment comprises a hexagonal channel or casing 10 having a plurality of lateral load pads 11 on the upper external surface and containing therein a plurality of fuel rods 12 in the upper region and an orifice/shield section 13 in the lower region, the fuel rods 12 being secured at the lower ends thereof in a fuel rod support 14 and having spacer wires 15 wrapped therearound to space the fuel rods 12 from adjacent rods and the interior surface of channel 10. The lateral load pads 11 function to space the fuel assemblies in the reactor core to allow for fuel assembly insertion and distortion, and minimize friction due to surface contact in sodium coolant. A nose subassembly 16 is secured to the lower end of channel 10 and includes a plurality of sodium inlets 17 for directing sodium coolant into channel 10 and having seals 18 on opposite ends of inlets 17 for preventing leakage of the sodium between the nose subassembly 16 and an opening 19 in associated support structure 20 within which subassembly 16 is located. Fuel assembly support points on structure 20 are indicated at 21 and 22. A top end subassembly 23 is secured to the upper end of channel 10, with the sodium coolant having passed upwardly around fuel rods 12, passing through a flow mixer 24 in the upper end of channel 10 and exhausting through an outlet indicated at 25 in the top end subassembly 23.

Each fuel rod 12 is a long, hollow, stainless steel tube with a central region containing plutonium-uranium oxide fuel pellets bordered above and below by a region of uranium oxide axial blanket pellets, and can, of course, be used in radial blanket arrangement. A welded stainless steel plug seals the tube at the bottom. The region above the upper blanket contains a fission gas plenum section and a fuel column hold-down device and is sealed at the top by a similar plug. The duct channel assembly (components 10, 16 and 23) is constructed of stainless steel and thus compatible with the liquid sodium coolant. The spacer wires are constructed of material such as 304 SS, 316 SS, and PE-16.

Table I gives physical dimensions of a typical prior known LMFBR wire-wrap fuel assembly by way of example:

TABLE I

| | |
|---|---|
| Overall Length, in. | ~ 165 |
| Hexagonal Duct, outside across flats, in. | 4.575 |
| Length of Nose Section, in. | ~ 36 |
| Length of Top Handle Section, in. | ~ 12 |
| Number of Fuel Rods per Assembly | 217 |
| Outside Diameter of Fuel Rods, in. | 0.230 |
| Fuel Rod Spacer Method | Wire Wrap |
| Spacer Wire Diameter, in. | ~ 0.056 |
| Spacer Wire Axial Pitch, in. | 12 |
| Rod Pitch (as assembled), in. | 0.286 |
| Rod Pitch to Diameter Ratio (P/D) | 1.24 |
| Typical As-Built Bundle Clearance, in. | ~ .034 |
| Channel Pad Height, in. | ~ 0.070 |
| Structural Materials | Type 316 SS 20% CW |

The fuel assembly must operate reliably for its design life in a complex environment of flowing sodium, temperature, fluence, and pressure gradients. It is subject to varying transients, material swelling, stress, and strain conditions.

Table II gives typical LMFBR wire-wrap fuel assembly operating environment and conditions:

TABLE II

| | |
|---|---|
| Flowing Sodium - Upward Through Assembly | |
| Inlet Temperature, ° F | 700–750 |
| Mixed Mean Core ΔT, ° F | 280–300 |
| Axial ΔP Sodium, psi | ~ 100 |
| Average Sodium Assembly Flow, lb/hr | ~ 2 × $10^5$ |
| Limiting* Radial ΔP across Channel Wall, psi | ~ 30 |
| Limiting** Radial ΔT across Assembly, ° F. | ~ 100 |
| Fluence - Peak at End-of-Assembly Life, nvt > 0.1 MeV | 2–3 × $10^{23}$ |
| Limiting*** Radial Fluence Gradient Across Assembly at end-of-life, nvt > 0.1 MeV | 2–3 × $10^{22}$ |
| Rod Burnup Avg. MWD/Te | ~ 100,000 |
| Rod Average Linear Power, Kw/ft | ~ 8 |
| Max. Material Temperature in Assembly at Fuel Rod Clad Hot Spot, ° F | ~ 1300+ |

*At the point where the resulting stress in the channel, as compared to the allowable, is a maximum. (Recognizing that the ΔP across the wall decreases from the bottom of the assembly to the top and the wall channel temperature increases.)
**At the point of maximum channel bending moment along the axial length of the fuel assembly. Normally near the top of the fuel in a fuel assembly adjacent to a control assembly.
***This is the maximum radial fluence gradient for the fuel assembly at the interface between fuel and blanket in a typical LMFBR.

The design of the fuel assembly must be closely coordinated with the neutronics design of the reactor, the design of the core restraint system, core orificing, reactor instrumentation system, core support structure, radial blanket assemblies, fuel storage system, refueling and handling systems, assembly inspection system, control assemblies, primary coolant system, emergency cooling system, rod waste system to assure compatibility of analytical procedures, integration of reactor loads, dimensional compatibility, thermal hydraulic compatibility, and safety.

The fuel assembly must provide maximum reliability to achieve rated reactor power output at rated reactor flow and temperature conditions throughout the design lifetime of the fuel. The fuel assemblies must be designed for operational temperature flow requirements due to startup, shutdown, normal load changes, transients resulting from malfunctions of equipment, and to meet overall plant capacity factors. Thus, the spacing of the fuel rods within the fuel assembly become important to assure maximum reliability under the aboveidentified operating conditions and environment.

Figure 2C:
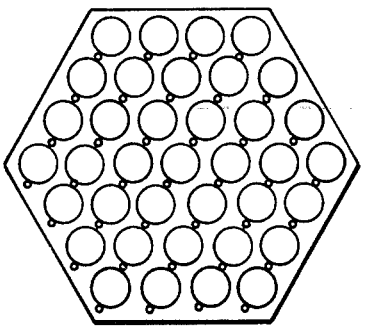
FIGS. 2a–2c illustrate the prior known constant-start wire wrap technique for fuel elements with a 12 inch wire wrap pitch.
Figure 2B:
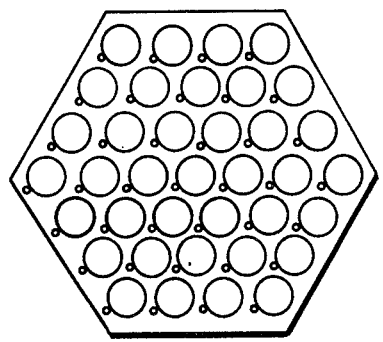
Figure 2A:
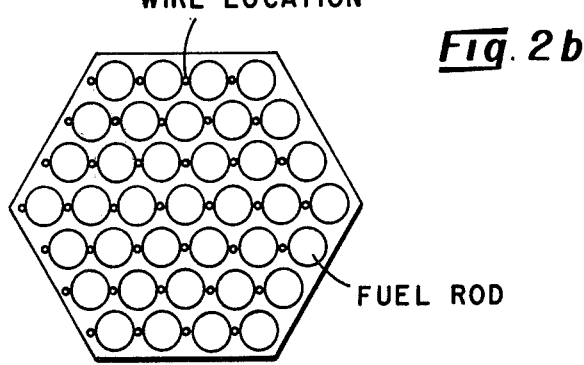

As pointed out above, prior known wire-wrap fuel rod designs have involved the so-called constant-start technique such as illustrated in FIGS. 2a–2C which shows cross-sectional views taken at varying axial locations (Z) for a 37-rod fuel assembly. In FIGS. 2a, 2b and 2c the fuel rods and wires are indicated by legend, with the axial locations thereof being $Z=0$, $Z=1$ inch, and $Z=2$ inches, respectively, for a 12 inch wire wrap pitch. Note that the adjacent fuel rods are separated or spaced by the diameter of the wire as it is wrapped helically about the rods.

Also, as pointed out above, the so-called staggered-start technique has been previously proposed such as the 0°-30°-60° design illustrated in FIGS. 3a–3e, which also show cross-sectional views taken at varying axial locations (Z) for a 37-rod assembly. The angles 0°, 30°, and 60° indicated in FIG. 3a represent the relative rotational orientations of the fuel rods. In FIGS. 3a–3e, the axial locations are $Z=0$, $Z=1$ inch, $Z=2$ inches, $Z=3$ inches, and $Z=4$ inches, respectively, for a 12 inch wire wrap pitch.

Figure 4:
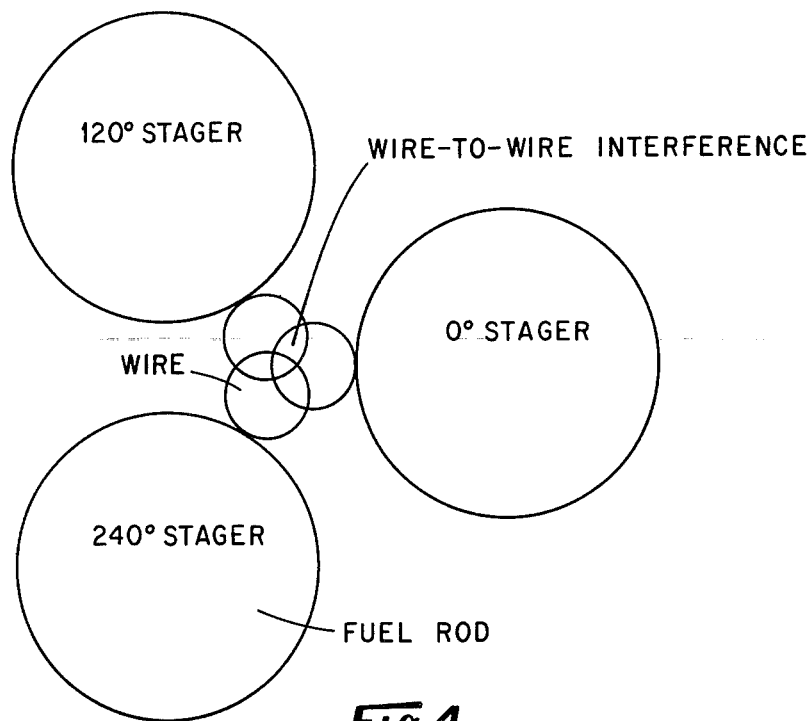
FIG. 4 illustrates a triangular pitch array for the prior known 0°-120°-240° stagger-start wire-wrap technique showing the undesired wire-to-wire interference.

FIG. 4 illustrates the prior efforts to utilize the staggered-start technique at an orientation of 0°-120°-240° which resulted in physical wire-to-wire interference as set forth above when the same pitch-to-diameter ratio utilized in the FIGS. 2a–2c and 3a–3e was maintained. The interference is indicated by legend in FIG. 4 which illustrates same by the overlapping of the wires between the fuel rods.

Figure 5:
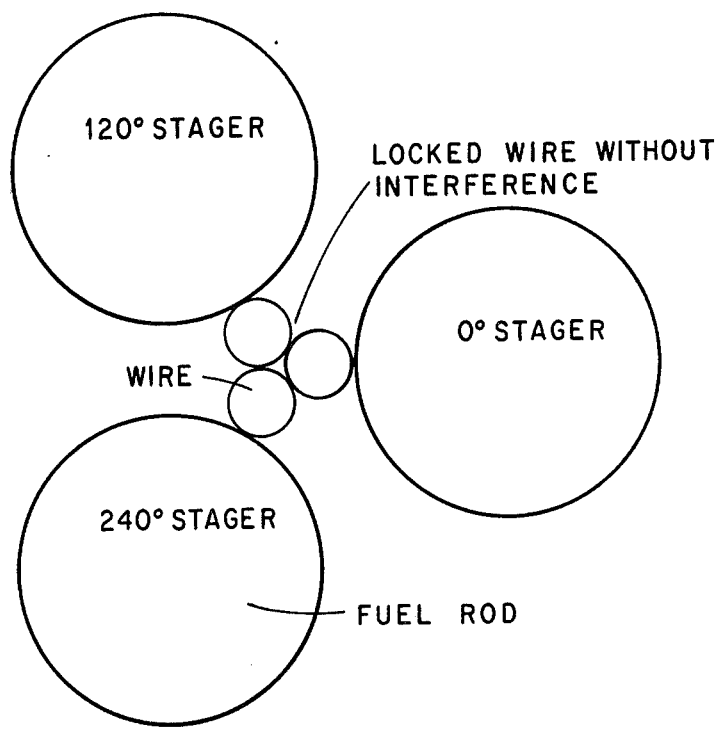
FIG. 5 illustrates a triangular pitch array for the lock-wrap 0°-120°-240° stagger-start wire-wrap produced by the method of the invention.

An 0°-120°-240° staggered-start design can be physically assembled, in accordance with the present innvention, for a given pitch-to-diameter ratio by decreasing the wire diameter to eliminate the wire-to-wire interference. FIG. 5 illustrates the invention, which essentially is a modification of the FIG. 4 technique, obtained by decreasing the wire diameter so that the wires are tangentially clustered rather than interfering and produce as locked wire or wrap without interference as indicated by legend and discussed in greater detail thereinafter. The diameter of the wire-wrap utilized in the prior known techniques and as given in Table I for a rod pitch-to-diameter ratio of 1.24 is 0.056 inch and composed of stainless steel.

In the present invention, for a wire-wrap having the same pitch-to-diameter ratio (1.24), the diameter of the wire is 0.046 inch. For pitch-to-diameter ratios of 1.15 to 1.30, the wire diameter will range from 0.035 to 0.053 inch, and is composed of material compatible with the fuel rod tubing and the liquid sodium coolant, such as 304 SS, 316 SS or PE-16, for example. Wire diameter (D) is a function of the pitch over diameter (P/D) and D.

An important geometric consideration in the wire-wrap method of the present invention is the manner in which the wires are locked together to prevent lateral movement of any fuel rod relative to the other two fuel rods for any triangular array of three fuel rods. This very stable engagement is in contrast with either the constant-start (FIGS. 2a–2c) or the staggered-start (FIGS. 3a–3e) rod-to-rod contact which is a unstable bearing of two convex, circular surfaces, the wire of one fuel rod against the tubing of the other fuel rod. The stable engagement provided by the invention is considered to be very important to insure that desired, stable modes of mechanical deformation will occur during in-reactor service.

The reduced wire diameter of the herein disclosed locked-wrap method also reduces the edge spacing and channel size for the same rod-to-rod spacing. As stated above, the manner in which the three adjacent wires engage each other tends to lock the rods together at each of the wire cluster locations. As one of the three clustered wires tries to escape the locked position, a section of that wire immediately above or below the locked plane is blocked by the wire of one or the other two rods which pass through the same rod-to-rod clearance flow channel.

Figure 6:
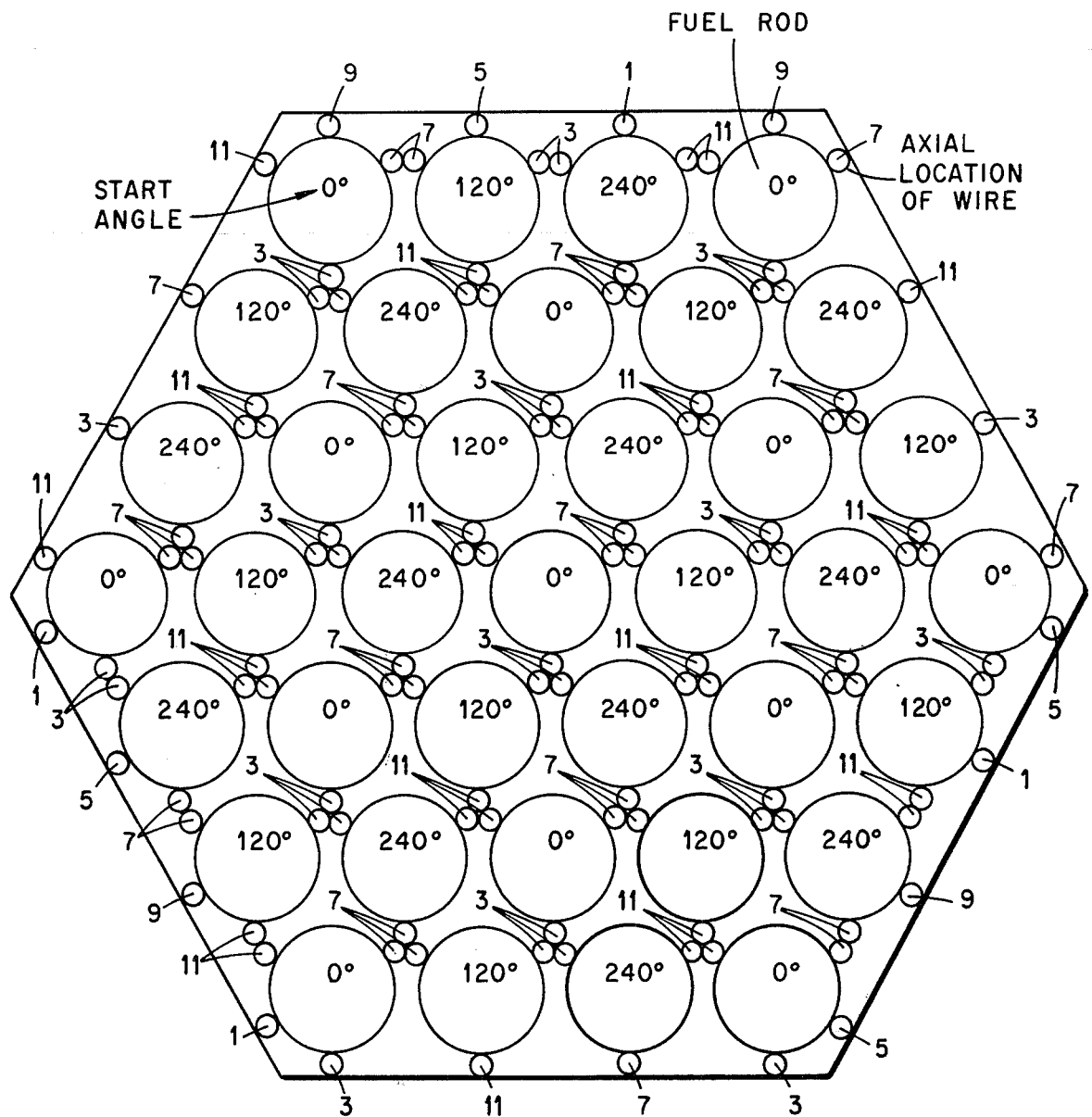
FIG. 6 schematically illustrates a cross-section of a 37-rod fuel assembly utilizing the lock-wrap method of the invention arbitrarily shown with a 12 inch helical pitch, for clarity.

FIG. 6 illustrates a 37-rod fuel bundle or assembly which incorporates the lock wrap design described above with respect to FIG. 5. The axial locations (Z) of all rod support points in a 12-inch axial pitch length are indicated throughout by the number grouping (Z being from 1–11).

Bundle compression will result in rod-to-rod nesting with a uniform helical binding of each fuel rod by 3 loads per wire-wrap helical pitch located at 120° intervals. The rods throughout the bundle will be more nearly uniformly loaded, with more near uniformity of deflected rod configurations than are predicted for other proposed wire-wrap configurations. The bundle channel interaction should produce little or no helical bending of the bundle as a whole, with rod-to-rod nesting being the predominant bundle characteristic. The basic stability of the loading pattern on each rod should result in no "dispersion" type behavior postulated for other configurations. With rod-to-rod nesting, bundle size has less effect on rod deflections and loads, as each new row accommodates the extra interference with the channel that the increased size produces.

In addition to the favorable deformation characteristics associated with the lock-wrap design, pointed out above, when compared to all other known wire-wrap designs, three addtional desirable performance characteristics are attained. These are:

1. There is a reduction in steel volume fraction, compared to constant or staggered-start designs, due to the use of a smaller diameter wire.
2. The contact between rods is one of wire-to-wire. This is superior to the wire-to-tubing contact which occurs in all other known wire-wrap designs. It prevents point loading on the fuel rods, due to differential expansion, distributing these loads in a line around the fuel rod in a helical fashion. This pattern of wire-to-wire contact may be far more significant in terms of fretting and wear considerations of the fuel rods which are caused by sliding, rolling or impacting between rods. With the lock-wrap design, all such movement will occur at the wire cluster rather than at the fuel rod surface. Most, or conceivably all, of the fretting and wear may be restricted to the wires only.
3. With the small wire wrap diameter, a reduction in edge spacing occurs, reducing edge coolant bypass flow and thereby improving the overall bundle thermal/hydraulic performance.

The locked-wrap spacing method also appears to provide aother improvement in thermal-hydraulic performance in that it produces a thermal-hydraulic trade-off. While the flow space between two rods, where maximum rod temperatures have occurred, will be cooler due to the reduced wire size and greater flow area, in half of the locations between three rods, there will be a reduction of coolant flow at the wire cluster locations, potentially producing higher cladding temperatures at these locations, thereby producing an overall improved thermal-hydraulic behavior, the amount of which has not yet been determined pending further testing.

The locked-wrap spacing method provides a reduced edge spacing, the effect of which is to produce edge temperatures closer to inside temperature. This reduced thermal gradient will reduce bundle-channel interference by greater matching of thermal expansion.

It has thus been shown that the present invention provides an improved method for spacing fast reactor fuel rods using a wire wrapping which is improved by orienting the wire-wrapped fuel rods in a 0°-120°-240° orientation and utilizing a small diameter wire whereby the desired pitch-to-diameter ratio can be maintained, thereby substantially improving the performance characteristics of the fuel assembly while producing a lock-wrap arrangement for the fuel rods.

While a particular embodiment of the invention has been illustrated and described, modifications will become apparent to those skilled in the art, and it is intended to cover in the appended claims all such modifications as come within the spirit and scope of the invention.

We claim:

1. A method for wire-wrap spacing nuclear fuel rods for a fuel assembly containing a plurality of fuel rods in a triangular pitch array comprising the steps of: wrapping wire about each of the fuel rods in a helical pattern by using a wire of a diameter ranging from 0.035 to 0.053 inch such that a rod pitch to wire diameter ratio in the range of about 1.15 to about 1.30 can be maintained without wire-to-wire interference caused by overlapping of wires on adjacent fuel rods, and positioning the thus wrapped rods throughout the fuel assembly such that the groupings of three rods in any triangular pitch array will contain three different start positions of the wire wrapping by placing the groupings of three rods in 0°-120°-240° orientations and such that the wire wrapping of adjacent rods forms a non-overlapping wire-to-wire contact forming a lock-wrap design tending to lock the rods together at each wire-wrap cluster.

* * * * *